US010271344B2

(12) United States Patent
Xu et al.

(10) Patent No.: US 10,271,344 B2
(45) Date of Patent: Apr. 23, 2019

(54) DATA CHANNEL SCHEDULING METHOD, DEVICE AND SYSTEM (71) Applicant: CHINA ACADEMY OF TELECOMMUNICATIONS TECHNOLOGY, Beijing (CN)

(72) Inventors: Weijie Xu, Beijing (CN); Xueming Pan, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 43 days.

(21) Appl. No.: 15/522,868

(22) PCT Filed: Oct. 14, 2015

(86) PCT No.: PCT/CN2015/091946
§ 371 (c)(1),
(2) Date: Apr. 28, 2017

(87) PCT Pub. No.: WO2016/070702
PCT Pub. Date: May 12, 2016

(65) Prior Publication Data
US 2017/0332388 A1 Nov. 16, 2017

(30) Foreign Application Priority Data

Nov. 6, 2014 (CN) .......................... 2014 1 0637906

(51) Int. Cl.
*H04W 72/12* (2009.01)
*H04W 76/27* (2018.01)
(Continued)

(52) U.S. Cl.
CPC ......... *H04W 72/12* (2013.01); *H04W 72/042* (2013.01); *H04W 72/0453* (2013.01);
(Continued)

(58) Field of Classification Search
CPC ... H04L 72/12; H04L 72/0453; H04L 72/042; H04L 76/27; H04L 76/046; H04L 5/0094
See application file for complete search history.

(56) References Cited

U.S. PATENT DOCUMENTS

2012/0188975 A1 7/2012 Li et al.
2012/0250631 A1* 10/2012 Hakola ................... H04L 5/001
370/329
(Continued)

FOREIGN PATENT DOCUMENTS

CN 102300331 A 12/2011
CN 103312402 A 9/2013
(Continued)

OTHER PUBLICATIONS

International Search Report for PCT/CN2015/091946 dated Jan. 12, 2016 and its English translation provided by WIPO.
(Continued)

*Primary Examiner* — Gary Mui
(74) *Attorney, Agent, or Firm* — Ladas & Parry, LLP (57) ABSTRACT

The present disclosure provides a data channel scheduling method, a data channel scheduling device and a data channel scheduling system. The data channel scheduling method includes steps of: configuring for a UE a set of serving cells; configuring for the UE a first serving cell and a second serving cell corresponding to each serving cell in the set of serving cells; transmitting a first PDCCH to the UE on the first serving cell corresponding to a third serving cell for scheduling the third serving cell to perform downlink data transmission with the UE; and transmitting a second PDCCH on the second serving cell corresponding to the third serving cell to the UE for scheduling the third serving cell to perform the uplink data transmission with the UE. The third serving cell is a serving cell in the set of serving cells. According to the present disclosure, the first serving (Continued)

cell for transmitting downlink scheduling information and the second serving cell for transmitting uplink scheduling information are configured separately for the serving cells for the data channel scheduling, so as to meet the requirements in the case that a carrier of an unlicensed frequency band is applied to CA.

20 Claims, 5 Drawing Sheets

(51) Int. Cl.
*H04W 72/04* (2009.01)
*H04W 88/02* (2009.01)
*H04W 88/08* (2009.01)

(52) U.S. Cl.
CPC ............ *H04W 76/27* (2018.02); *H04W 88/02* (2013.01); *H04W 88/08* (2013.01)

(56) References Cited

U.S. PATENT DOCUMENTS

| | | | |
|---|---|---|---|
| 2012/0281593 A1 | 11/2012 | Stewart et al. | |
| 2012/0287865 A1 | 11/2012 | Wu et al. | |
| 2013/0010619 A1 | 1/2013 | Fong et al. | |
| 2014/0098774 A1 | 4/2014 | Gao et al. | |
| 2014/0233538 A1 | 8/2014 | Zhang et al. | |
| 2016/0095114 A1* | 3/2016 | Kim ................ | H04W 74/0816 370/329 |
| 2017/0251461 A1* | 8/2017 | Parkvall ............ | H04W 72/0406 |
| 2017/0265225 A1* | 9/2017 | Takeda .............. | H04W 74/0816 |
| 2017/0310434 A1* | 10/2017 | Harada .................. | H04L 5/001 |
| 2017/0332393 A1* | 11/2017 | Lee ................... | H04W 72/1263 |
| 2017/0339641 A1* | 11/2017 | Nigam .............. | H04W 52/0229 |
| 2017/0347365 A1* | 11/2017 | Xu ....................... | H04W 72/12 |

FOREIGN PATENT DOCUMENTS

| | | |
|---|---|---|
| EP | 2680654 A1 | 1/2014 |
| JP | 2013/506359 A | 2/2013 |
| JP | 2014/513504 | 5/2014 |
| WO | 2014/021984 A1 | 2/2014 |
| WO | 2014/026381 A1 | 2/2014 |
| WO | 2014/067451 A1 | 5/2014 |
| WO | 2014/117391 A1 | 8/2014 |

OTHER PUBLICATIONS

Written Opinion of the International Search Authority for PCT/CN2015/091946 dated Jan. 12, 2016 and its English translation provided by WIPO.
International Preliminary Report of Patentability (IPRP; Ch. 1) for PCT/CN2015/091946 dated May 18, 2017 and its English translation provided by WIPO.
From EPO Application No. 15856180.3, Supplementary European Search Report and Search Opinion dated Sep. 21, 2017.
From JP 2017-523871, Office Action dated Jun. 19, 2018 with English translation from Global Dossier.
R1- 143751—CATT, "Required functionalities for Licensed-Assisted Access Using LTE"; 3GPP TSG RAN WG1 Meeting #78bis; Ljubljana, Slovenia, Oct. 6-10, 2014; pp. 1-4.
R1-144042—LG Electronics, "Candidate solutions for LAA operation"; 3GPP TSG RAN WG1 Meeting #78bis; Ljubljana, Slovenia, Oct. 6-10, 2014; pp. 1-6.
R1-155257—ZTE, "Discussion on Scheduling Combinations for LAA"; 3GPP TSG RAN WG1 Meeting #82bis; Malmö, Sweden, Oct. 5-9, 2015; pp. 1-3.

* cited by examiner

DATA CHANNEL SCHEDULING METHOD, DEVICE AND SYSTEM

CROSS-REFERENCE TO RELATED APPLICATIONS

The present application is the U.S. national phase of PCT Application PCT/CN2015/091946 file on Oct. 14, 2015, which claims a priority to Chinese Patent Application No. 201410637906.4 filed on Nov. 6, 2014, the disclosures of which are incorporated herein by reference in their entireties.

TECHNICAL FIELD

The present disclosure relates to the field of wireless communication technology, in particular to a data channel scheduling method, a data channel scheduling device and a data channel scheduling system.

BACKGROUND

As mobile data service volume continues to grow, spectrum resources have become more and more scarce, and for network deployment and service transmission, it is impossible to meet the requirements of the increased data service volume by merely using licensed spectrum resources. Hence, for a Long Term Evolution (LTE) system, the network development and the service transmission on unlicensed spectrum resources may be taken into consideration so as to improve the user experience and expand a network coverage, and this LTE system may be called as Unlicensed LTE (U-LTE or LTE-U for short).

For the unlicensed spectrum resources, no specific application system has been planned, and they may be shared by various radio communication systems, such as Bluetooth and Wireless Fidelity (WiFi). The shared unlicensed spectrum resources may be used by various systems through resource preemption. For example, the WiFi system may preempt the resources on the unlicensed frequency band in the following ways. At first, it may monitor a channel, and in the case that an idle time of the channel reaches a Distributed Inter-Frame Space (DIFS), it may determine that the current channel is a clear channel. Then, sites which are waiting for access to the channel may be in a random backoff stage, so as to prevent the collision of the sites on the same resource. In addition, in order to ensure fairness, it is further speculated that the spectrum resource cannot be occupied by each site for a long time period. As a certain time period expires or a data transmission volume reaches an upper limit, the resource needs to be released, so that the other device or system can preempt the resource.

In the case that the LTE system operates on a carrier of the unlicensed frequency band, an LTE base station and a User Equipment (UE) also need to perform resource contention, so as to ensure that the spectrum resources can be shared fairly between the LTE system and any other device or system.

Currently, there is no concrete scheme about how the LTE system can operate on the unlicensed frequency band. One agreed method is to use the spectrum resources on a carrier of the unlicensed frequency band through a carrier aggregation (CA) mechanism, i.e., the carrier of the unlicensed frequency band may serve as a secondary carrier (Scell) in the CA mechanism for the data transmission.

In accordance with the provisions on the CA mechanism in a conventional protocol, it is impossible to meet the requirements in the case that the carrier of the unlicensed frequency band is applied to the CA.

SUMMARY

An object of the present disclosure is to provide a data channel scheduling method, a data channel scheduling device and a data channel scheduling system, so as to meet the requirements in the case that the carrier of the unlicensed frequency band is applied to the CA.

In one aspect, the present disclosure provides in some embodiments a data channel scheduling method, including steps of: configuring for a UE a set of serving cells, the set of serving cells including at least one serving cell; configuring for the UE a first serving cell corresponding to each serving cell in the set of serving cells, the first serving cell being a serving cell in the set of serving cells; configuring for the UE a second serving cell corresponding to each serving cell in the set of serving cells, the second serving cell being a serving cell in the set of serving cells; transmitting a first Physical Downlink Control Channel (PDCCH) to the UE on the first serving cell corresponding to a third serving cell, the first PDCCH carrying downlink scheduling information for scheduling the third serving cell to perform downlink data transmission with the UE, the third serving cell being a serving cell in the set of serving cells which is configured to perform uplink data transmission and the downlink data transmission with the UE; and transmitting a second PDCCH on the second serving cell corresponding to the third serving cell to the UE, the second PDCCH carrying uplink scheduling information for scheduling the third serving cell to perform the uplink data transmission with the UE.

In a possible embodiment of the present disclosure, the first serving cell corresponding to each serving cell in the set of serving cells is the serving cell itself, or any serving cell other than the serving cell.

In a possible embodiment of the present disclosure, in the case that the first serving cell is the serving cell itself, the first serving cell operates at an unlicensed frequency band. And in the case that the first serving cell is any serving cell other than the serving cell, the first serving cell operates at a licensed frequency band.

In a possible embodiment of the present disclosure, the second serving cell corresponding to each serving cell in the set of serving cells is any serving cell other than the serving cell, or the serving cell itself.

In a possible embodiment of the present disclosure, in the case that the second serving cell is any serving cell other than the serving cell, the second serving cell operates at a licensed frequency band. And in the case that the second serving cell is the serving cell itself, the second serving cell operates at an unlicensed frequency band.

In a possible embodiment of the present disclosure, the first serving cell and the second serving cell corresponding to an identical serving cell in the set of serving cells are an identical serving cell or different serving cells.

In a possible embodiment of the present disclosure, the step of configuring for the UE the set of serving cells includes configuring for the UE the set of serving cells through radio resource control (RRC) signaling.

In a possible embodiment of the present disclosure, the step of configuring for the UE the first serving cell corresponding to each serving cell in the set of serving cells includes configuring for the UE the first serving cell corresponding to each serving cell in the set of serving cells through RRC signaling.

In a possible embodiment of the present disclosure, the step of configuring for the UE the second serving cell corresponding to each serving cell in the set of serving cells includes configuring for the UE the second serving cell corresponding to each serving cell in the set of serving cells through RRC signaling.

In another aspect, the present disclosure provides in some embodiments a data channel scheduling method, including steps of: receiving from a base station a configuration of a set of serving cells, the set of serving cells including at least one serving cell; receiving from the base station a configuration of a first serving cell corresponding to each serving cell in the set of serving cells, the first serving cell being a serving cell in the set of serving cells; receiving from the base station a configuration of a second serving cell corresponding to each serving cell in the set of serving cells, the second serving cell being a serving cell in the set of serving cells; receiving a first PDCCH on the first serving cell corresponding to a third serving cell, the PDCCH carrying downlink scheduling information for scheduling the third serving cell to perform downlink data transmission with a current UE, the third serving cell being a serving cell in the set of serving cells which is configured to perform uplink data transmission and the downlink data transmission with the current UE; and receiving a second PDCCH on the second serving cell corresponding to the third serving cell, the second PDCCH carrying uplink scheduling information for scheduling the third serving cell to perform the uplink data transmission with the current UE.

In a possible embodiment of the present disclosure, the first serving cell corresponding to each serving cell in the set of serving cells is the serving cell itself, or any serving cell other than the serving cell.

In a possible embodiment of the present disclosure, in the case that the first serving cell is the serving cell itself, the first serving cell operates at an unlicensed frequency band, and in the case that the first serving cell is any serving cell other than the serving cell, the first serving cell operates at a licensed frequency band.

In a possible embodiment of the present disclosure, the second serving cell corresponding to each serving cell in the set of serving cells is any serving cell other than the serving cell, or the serving cell itself.

In a possible embodiment of the present disclosure, in the case that the second serving cell is any serving cell other than the serving cell, the second serving cell operates at a licensed frequency band, and in the case that the second serving cell is the serving cell itself, the second serving cell operates at an unlicensed frequency band.

In a possible embodiment of the present disclosure, the first serving cell and the second serving cell corresponding to an identical serving cell in the set of serving cells are an identical serving cell or different serving cells.

In a possible embodiment of the present disclosure, the step of receiving from the base station the configuration of the set of serving cells includes receiving from the base station the configuration of the set of serving cells through RRC signaling.

In a possible embodiment of the present disclosure, the step of receiving from the base station the configuration of the first serving cell corresponding to each serving cell in the set of serving cells includes receiving from the base station the configuration of the first serving cell corresponding to each serving cell in the set of serving cells through RRC signaling.

In a possible embodiment of the present disclosure, the step of receiving from the base station the configuration of the second serving cell corresponding to each serving cell in the set of serving cells includes receiving from the base station the configuration of the second serving cell corresponding to each serving cell in the set of serving cells through RRC signaling.

In yet another aspect, the present disclosure provides in some embodiments a data channel scheduling method, including steps of: configuring, by a base station, for a UE a set of serving cells, the set of serving cells including at least one serving cell; receiving, by the UE, from the base station a configuration of the set of serving cells; configuring, by the base station, for the UE a first serving cell corresponding to each serving cell in the set of serving cells, the first serving cell being a serving cell in the set of serving cells; receiving, by the UE, from the base station a configuration of the first serving cell corresponding to each serving cell in the set of serving cells; configuring, by the base station, for the UE a second serving cell corresponding to each serving cell in the set of serving cells, the second serving cell being a serving cell in the set of serving cells; receiving, by the UE, from the base station a configuration of the second serving cell corresponding to each serving cell in the set of serving cells; transmitting, by the base station, to the UE a first PDCCH on the first serving cell corresponding to a third serving cell, the first PDCCH carrying downlink scheduling information for scheduling the third serving cell to perform downlink data transmission with the UE, the third serving cell being a serving cell in the set of serving cells which is configured to perform uplink data transmission and the downlink data transmission with the UE; receiving, by the UE, from the base station the first PDCCH on the first serving cell corresponding to the third serving cell in the set of serving cells; transmitting, by the base station, to the UE a second PDCCH on the second serving cell corresponding to the third serving cell, the second PDCCH carrying uplink scheduling information for scheduling the third serving cell to perform the uplink data transmission with the UE; and receiving, by the UE, from the base station the second PDCCH on the second serving cell corresponding to the third serving cell.

In still yet another aspect, the present disclosure provides in some embodiments a data channel scheduling device, including: a set configuration module configured to configure for a UE a set of serving cells, the set of serving cells including at least one serving cell; a first serving cell configuration module configured to configure for the UE a first serving cell corresponding to each serving cell in the set of serving cells, the first serving cell being a serving cell in the set of serving cells; a second serving cell configuration module configured to configure for the UE a second serving cell corresponding to each serving cell in the set of serving cells, the second serving cell being a serving cell in the set of serving cells; a downlink scheduling information transmission module configured to transmit a first PDCCH to the UE on the first serving cell corresponding to a third serving cell, the first PDCCH carrying downlink scheduling information for scheduling the third serving cell to perform downlink data transmission with the UE, the third serving cell being a serving cell in the set of serving cells which is configured to perform uplink data transmission and the downlink data transmission with the UE; and an uplink scheduling information transmission module configured to transmit a second PDCCH on the second serving cell corresponding to the third serving cell to the UE, the second PDCCH carrying uplink scheduling information for scheduling the third serving cell to perform the uplink data transmission with the UE.

In a possible embodiment of the present disclosure, the first serving cell corresponding to each serving cell in the set of serving cells is the serving cell itself, or any serving cell other than the serving cell.

In a possible embodiment of the present disclosure, in the case that the first serving cell is the serving cell itself, the first serving cell operates at an unlicensed frequency band, and in the case that the first serving cell is any serving cell other than the serving cell, the first serving cell operates at a licensed frequency band.

In a possible embodiment of the present disclosure, the second serving cell corresponding to each serving cell in the set of serving cells is any serving cell other than the serving cell, or the serving cell itself.

In a possible embodiment of the present disclosure, in the case that the second serving cell is any serving cell other than the serving cell, the second serving cell operates at a licensed frequency band, and in the case that the second serving cell is the serving cell itself, the second serving cell operates at an unlicensed frequency band.

In a possible embodiment of the present disclosure, the first serving cell and the second serving cell corresponding to an identical serving cell in the set of serving cells are an identical serving cell or different serving cells.

In a possible embodiment of the present disclosure, the set configuration module is further configured to configure for the UE the set of serving cells through RRC signaling.

In a possible embodiment of the present disclosure, the first serving cell configuration module is further configured to configure for the UE the first serving cell corresponding to each serving cell in the set of serving cells through RRC signaling.

In a possible embodiment of the present disclosure, the second serving cell configuration module is configured to configure for the UE the second serving cell corresponding to each serving cell in the set of serving cells through RRC signaling.

In still yet another aspect, the present disclosure provides in some embodiments a base station, including a processor, a memory and a transceiver. The processor is configured to read a program stored in the memory, and perform the following procedure: configure for a UE a set of serving cells, the set of serving cells including at least one serving cell; configure for the UE a first serving cell corresponding to each serving cell in the set of serving cells, the first serving cell being a serving cell in the set of serving cells; configure for the UE a second serving cell corresponding to each serving cell in the set of serving cells, the second serving cell being a serving cell in the set of serving cells; transmit through the transceiver a first PDCCH to the UE on the first serving cell corresponding to a third serving cell, the first PDCCH carrying downlink scheduling information for scheduling the third serving cell to perform downlink data transmission with the UE, the third serving cell being a serving cell in the set of serving cells which is configured to perform uplink data transmission and the downlink data transmission with the UE; and transmit through the transceiver a second PDCCH on the second serving cell corresponding to the third serving cell to the UE, the second PDCCH carrying uplink scheduling information for scheduling the third serving cell to perform the uplink data transmission with the UE. The transceiver is configured to receive and transmit data under the control of the processor. The memory may store therein data for the operation of the processor.

In a possible embodiment of the present disclosure, the first serving cell corresponding to each serving cell in the set of serving cells is the serving cell itself, or any serving cell other than the serving cell.

In a possible embodiment of the present disclosure, in the case that the first serving cell is the serving cell itself, the first serving cell operates at an unlicensed frequency band, and in the case that the first serving cell is any serving cell other than the serving cell, the first serving cell operates at a licensed frequency band.

In a possible embodiment of the present disclosure, the second serving cell corresponding to each serving cell in the set of serving cells is any serving cell other than the serving cell, or the serving cell itself.

In a possible embodiment of the present disclosure, in the case that the second serving cell is any serving cell other than the serving cell, the second serving cell operates at a licensed frequency band, and in the case that the second serving cell is the serving cell itself, the second serving cell operates at an unlicensed frequency band.

In a possible embodiment of the present disclosure, the first serving cell and the second serving cell corresponding to an identical serving cell in the set of serving cells are an identical serving cell or different serving cells.

In a possible embodiment of the present disclosure, the processor is further configured to configure for the UE the set of serving cells through RRC signaling.

In a possible embodiment of the present disclosure, the processor is further configured to configure for the UE the first serving cell corresponding to each serving cell in the set of serving cells through RRC signaling.

In a possible embodiment of the present disclosure, the processor is further configured to configure for the UE the second serving cell corresponding to each serving cell in the set of serving cells through RRC signaling.

In still yet another aspect, the present disclosure provides in some embodiments a data channel scheduling device, including: a set configuration reception module configured to receive from a base station a configuration of a set of serving cells, the set of serving cells including at least one serving cell; a first serving cell configuration reception module configured to receive from the base station a configuration of a first serving cell corresponding to each serving cell in the set of serving cells, the first serving cell being a serving cell in the set of serving cells; a second serving cell configuration reception module configured to receive from the base station a configuration of a second serving cell corresponding to each serving cell in the set of serving cells, the second serving cell being a serving cell in the set of serving cells; a downlink scheduling information reception module configured to receive a first PDCCH on the first serving cell corresponding to a third serving cell, the PDCCH carrying downlink scheduling information for scheduling the third serving cell to perform downlink data transmission with a current UE, the third serving cell being a serving cell in the set of serving cells which is configured to perform uplink data transmission and the downlink data transmission with the current UE; and an uplink scheduling information reception module configured to receive a second PDCCH on the second serving cell corresponding to the third serving cell, the second PDCCH carrying uplink scheduling information for scheduling the third serving cell to perform the uplink data transmission with the current UE.

In a possible embodiment of the present disclosure, the first serving cell corresponding to each serving cell in the set of serving cells is the serving cell itself, or any serving cell other than the serving cell.

In a possible embodiment of the present disclosure, in the case that the first serving cell is the serving cell itself, the first serving cell operates at an unlicensed frequency band, and in the case that the first serving cell is any serving cell other than the serving cell, the first serving cell operates at a licensed frequency band.

In a possible embodiment of the present disclosure, the second serving cell corresponding to each serving cell in the set of serving cells is any serving cell other than the serving cell, or the serving cell itself.

In a possible embodiment of the present disclosure, in the case that the second serving cell is any serving cell other than the serving cell, the second serving cell operates at a licensed frequency band, and in the case that the second serving cell is the serving cell itself, the second serving cell operates at an unlicensed frequency band.

In a possible embodiment of the present disclosure, the first serving cell and the second serving cell corresponding to an identical serving cell in the set of serving cells are an identical serving cell or different serving cells.

In a possible embodiment of the present disclosure, the set configuration reception module is further configured to receive from the base station the configuration of the set of serving cells through RRC signaling.

In a possible embodiment of the present disclosure, the first serving cell configuration reception module is further configured to receive from the base station the configuration of the first serving cell corresponding to each serving cell in the set of serving cells through RRC signaling.

In a possible embodiment of the present disclosure, the second serving cell configuration reception module is further configured to receive from the base station the configuration of the second serving cell corresponding to each serving cell in the set of serving cells through RRC signaling.

In still yet another aspect, the present disclosure provides in some embodiments a UE, including a processor, a memory and a transceiver. The processor is configured to read a program stored in the memory, and perform the following procedure: receive through the transceiver from a base station a configuration of a set of serving cells, the set of serving cells including at least one serving cell; receive through the transceiver from the base station a configuration of a first serving cell corresponding to each serving cell in the set of serving cells, the first serving cell being a serving cell in the set of serving cells; receive through the transceiver from the base station a configuration of a second serving cell corresponding to each serving cell in the set of serving cells, the second serving cell being a serving cell in the set of serving cells; receive through the transceiver a first PDCCH on the first serving cell corresponding to a third serving cell, the PDCCH carrying downlink scheduling information for scheduling the third serving cell to perform downlink data transmission with a current UE, the third serving cell being a serving cell in the set of serving cells which is configured to perform uplink data transmission and the downlink data transmission with the current UE; and receive through the transceiver a second PDCCH on the second serving cell corresponding to the third serving cell, the second PDCCH carrying uplink scheduling information for scheduling the third serving cell to perform the uplink data transmission with the current UE. The transceiver is configured to receive and transmit data under the control of the processor. The memory may store therein data for the operation of the processor.

In a possible embodiment of the present disclosure, the first serving cell corresponding to each serving cell in the set of serving cells is the serving cell itself, or any serving cell other than the serving cell.

In a possible embodiment of the present disclosure, in the case that the first serving cell is the serving cell itself, the first serving cell operates at an unlicensed frequency band, and in the case that the first serving cell is any serving cell other than the serving cell, the first serving cell operates at a licensed frequency band.

In a possible embodiment of the present disclosure, the second serving cell corresponding to each serving cell in the set of serving cells is any serving cell other than the serving cell, or the serving cell itself.

In a possible embodiment of the present disclosure, in the case that the second serving cell is any serving cell other than the serving cell, the second serving cell operates at a licensed frequency band, and in the case that the second serving cell is the serving cell itself, the second serving cell operates at an unlicensed frequency band.

In a possible embodiment of the present disclosure, the first serving cell and the second serving cell corresponding to an identical serving cell in the set of serving cells are an identical serving cell or different serving cells.

In a possible embodiment of the present disclosure, the processor is further configured to receive from the base station the configuration of the set of serving cells through RRC signaling.

In a possible embodiment of the present disclosure, the processor is further configured to receive from the base station the configuration of the first serving cell corresponding to each serving cell in the set of serving cells through RRC signaling.

In a possible embodiment of the present disclosure, the processor is further configured to receive from the base station the configuration of the second serving cell corresponding to each serving cell in the set of serving cells through RRC signaling.

In still yet another aspect, the present disclosure provides in some embodiments a data channel scheduling system, including a base station and a UE. The base station is configured to: configure for the UE a set of serving cells, the set of serving cells including at least one serving cell; configure for the UE a first serving cell corresponding to each serving cell in the set of serving cells, the first serving cell being a serving cell in the set of serving cells; configure for the UE a second serving cell corresponding to each serving cell in the set of serving cells, the second serving cell being a serving cell in the set of serving cells; transmit a first PDCCH to the UE on the first serving cell corresponding to a third serving cell, the first PDCCH carrying downlink scheduling information for scheduling the third serving cell to perform downlink data transmission with the UE, the third serving cell being a serving cell in the set of serving cells which is configured to perform uplink data transmission and the downlink data transmission with the UE; and transmit a second PDCCH on the second serving cell corresponding to the third serving cell to the UE, the second PDCCH carrying uplink scheduling information for scheduling the third serving cell to perform the uplink data transmission with the UE. The UE is configured to: receive from a base station a configuration of the set of serving cells; receive from the base station a configuration of the first serving cell corresponding to each serving cell in the set of serving cells; receive from the base station a configuration of the second serving cell corresponding to each serving cell in the set of serving cells; receive the first PDCCH on the first serving cell corresponding to the third serving cell; and receive the second PDCCH on the second serving cell corresponding to the third serving cell.

According to the data channel scheduling methods, devices and system in the embodiments of the present disclosure, the first serving cell for scheduling downlink data for the third serving cell and the second serving cell for scheduling uplink data for the third serving cell may be configured separately, so as to meet the requirements in the case that a carrier of an unlicensed frequency band is applied to CA.

DETAILED DESCRIPTION OF THE EMBODIMENTS

The present disclosure will be described hereinafter in conjunction with the drawings and embodiments.

In the followings, schemes in the embodiments of the present disclosure are described on the basis of both a base station side and a UE side, and then on the basis of each of the base station side and the UE side. However, it does not mean that the schemes must be implemented through the cooperation of the base station side and the UE side. Actually, in the case that the schemes are implemented at the base station side and the UE side separately, it is also able to solve the problems existing at the base station side and the UE side. Of course, in the case that the schemes are implemented at both the base station side and the UE side, it is able to achieve a better effect.

Figure 1:
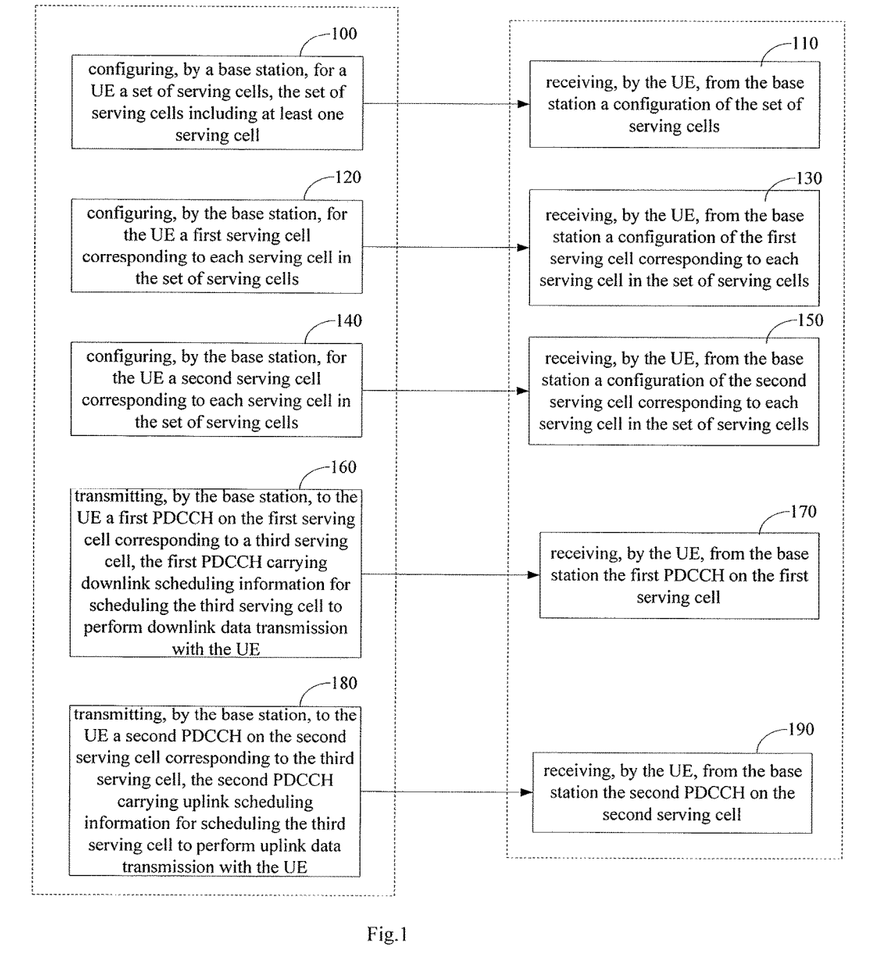
FIG. 1 is a flow chart of a data channel scheduling method implemented by both a base station and a UE according to one embodiment of the present disclosure.

The present disclosure provides in some embodiments a data channel scheduling method implemented by both a base station and a UE, which, as shown in FIG. 1, includes the following steps.

Step 100: configuring, by the base station, for the UE a set of serving cells, the set of serving cells including at least one serving cell. In the embodiments of the present disclosure, the step of configuring, by the base station, for the UE the set of serving cells includes allocating, by the base station, for the UE the set of serving cells and transmitting configuration information about the set of serving cells to the UE. In a possible embodiment of the present disclosure, the set of serving cells consists of activated serving cells.

Step 110: receiving, by the UE, from the base station a configuration of the set of serving cells, i.e., receiving, by the UE, from the base station the configuration information about the set of serving cells.

Step 120: configuring, by the base station, for the UE a first serving cell corresponding to each serving cell in the set of serving cells, the first serving cell being a serving cell in the set of serving cells. In the embodiments of the present disclosure, the step of configuring, by the base station, for the UE the first serving cell corresponding to each serving cell in the set of serving cells includes allocating, by the base station, for the UE the first serving cell corresponding to each serving cell in the set of serving cells, and transmitting configuration information about the allocated first serving cell to the UE.

Step 130: receiving, by the UE, from the base station a configuration of the first serving cell corresponding to each serving cell in the set of serving cells, i.e., receiving, by the UE, from the base station the configuration information about the first serving cell.

Step 140: configuring, by the base station, for the UE a second serving cell corresponding to each serving cell in the set of serving cells, the second serving cell being a serving cell in the set of serving cells. In the embodiments of the present disclosure, the step of configuring, by the base station, for the UE the second serving cell corresponding to each serving cell in the set of serving cells includes allocating, by the base station, for the UE the second serving cell corresponding to each serving cell in the set of serving cells, and transmitting configuration information about the allocated second serving cell to the UE.

Step 150: receiving, by the UE, from the base station a configuration of the second serving cell corresponding to each serving cell in the set of serving cells, i.e., receiving, by the UE, from the base station the configuration information about the second serving cell.

Step 160: transmitting, by the base station, to the UE a first PDCCH on the first serving cell corresponding to a third serving cell, the first PDCCH carrying downlink scheduling information for scheduling the third serving cell to perform downlink data transmission with the UE. In the embodiments of the present disclosure, the first serving cell is a serving cell for scheduling the corresponding serving cell to perform the downlink data transmission with the UE, and a PDCCH transmitted by the first serving cell and carrying the downlink scheduling information is called as the first PDCCH.

Step 170: receiving, by the UE, from the base station the first PDCCH on the first serving cell.

Step 180: transmitting, by the base station, to the UE a second PDCCH on the second serving cell corresponding to the third serving cell, the second PDCCH carrying uplink scheduling information for scheduling the third serving cell to perform uplink data transmission with the UE. In the embodiments of the present disclosure, the second serving cell is a serving cell for scheduling the corresponding serving cell to perform the uplink data transmission with the UE, and a PDCCH transmitted by the second serving cell and carrying the uplink scheduling information is called as the second PDCCH. The third serving cell is a serving cell in the set of serving cells which is configured to perform uplink data transmission and the downlink data transmission with the UE.

Step 190: receiving, by the UE, from the base station the second PDCCH on the second serving cell.

In a possible embodiment of the present disclosure, each serving cell may operate on a carrier of a licensed frequency band, or a carrier of an unlicensed frequency band.

In a possible embodiment of the present disclosure, the first serving cell and the second serving cell corresponding to an identical serving cell in the set of serving cells may be an identical serving cell or different serving cells.

In a possible embodiment of the present disclosure, the first serving cell corresponding to each serving cell in the set of serving cells may be the serving cell itself, or any serving cell other than the serving cell. In the case that the first serving cell is the serving cell itself, the first serving cell may operate at the unlicensed frequency band, and in the case that the first serving cell is any serving cell other than the serving cell, the first serving cell may operate at the licensed frequency band.

In a possible embodiment of the present disclosure, the second serving cell corresponding to each serving cell in the set of serving cells may be any serving cell other than the serving cell, or the serving cell itself. In the case that the second serving cell is any serving cell other than the serving cell, the second serving cell may operate at the licensed frequency band, and in the case that the second serving cell is the serving cell itself, the second serving cell may operate at the unlicensed frequency band.

It should be appreciated that, in the embodiments of the present disclosure, the set of the serving cells may be re-configured.

Every time the set of serving cells has been configured, the timing for configuring a set of the first serving cells and a set of the second serving cells may depend on an actual scenario and the requirements of an operator, which will not be particularly defined herein. In addition, the first serving cell and the second serving cell may also be re-configured. The first serving cell and the second serving cell may be configured separately for an identical serving cell, and an order for configuring them is not particularly defined herein.

It should be further appreciated that, an order of performing Steps 160 and 180 is not be particularly defined herein. In the case that it is necessary to perform the downlink scheduling operation, Step 160 may be performed, and in the case that it is necessary to perform the uplink scheduling operation, Step 180 may be performed.

According to the data channel scheduling method in the embodiments of the present disclosure, the first serving cell for scheduling downlink data for the third serving cell and the second serving cell for scheduling uplink data for the third serving cell may be configured separately, so as to meet the requirements in the case that the carrier of the unlicensed frequency band is applied to CA.

Figure 2:
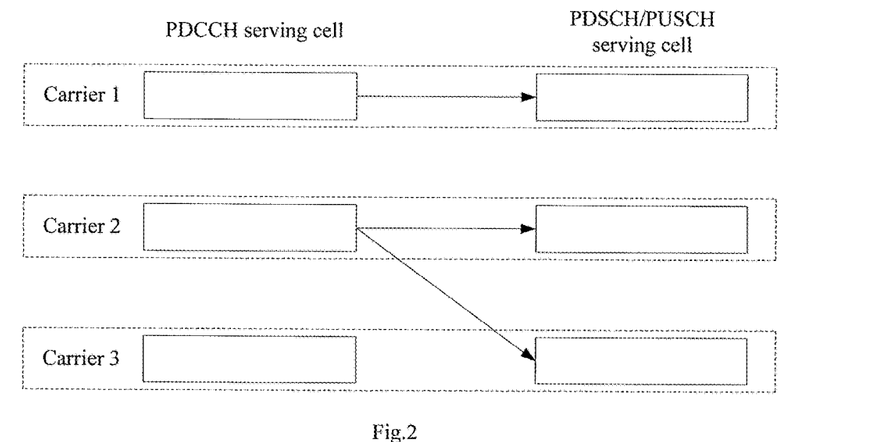
FIG. 2 is a schematic view showing the relationship between a PDCCH serving cell and a Physical Downlink Shared Channel (PDSCH)/Physical Uplink Shared Channel (PUSCH) serving cell in the related art.
Figure 3:
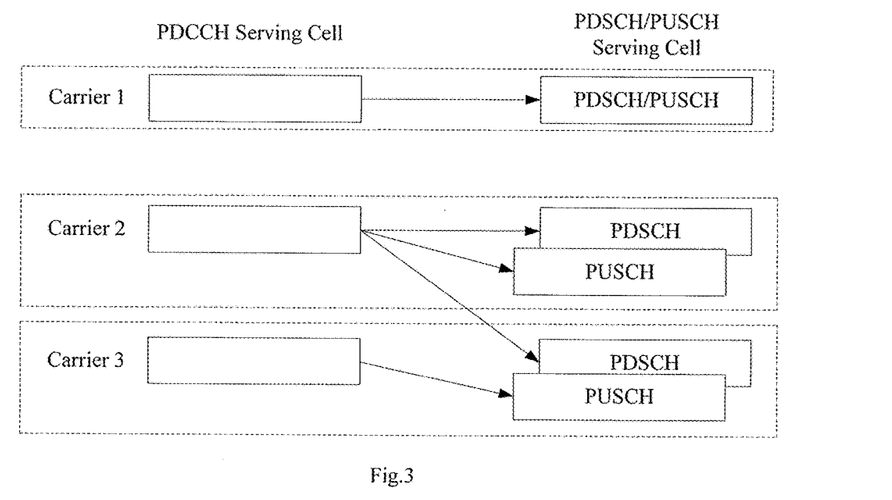
FIG. 3 is a schematic view showing the relationship between the PDCCH serving cell and the PDSCH/PUSCH serving cell according to one embodiment of the present disclosure.

It is found by the inventor that, for the CA mechanism stipulated in a conventional protocol, in the case of configuring the association relationship between the serving cell for the data transmission and the serving cell for transmitting the scheduling information, the scheduling information for scheduling the downlink data and the uplink data for the serving cell may merely be transmitted through an identical serving cell, as shown in FIG. 2. FIG. 2 shows a scenario where the UE is served by three serving cells which operate on carrier 1, carrier 2 and carrier 3 respectively. A serving cell for transmitting a PDSCH and receiving a PUSCH (PDSCH/PUSCH serving cell, i.e., the third serving cell in the embodiments of the present disclosure) may merely be scheduled by one of the three serving cells (i.e., a PDCCH serving cell). However, in the embodiments of the present disclosure, the first serving cell for scheduling the downlink data for the third serving cell and the second serving cell for scheduling the uplink data for the third serving cell may be configured separately. Still taking the above three serving cells as an example, as shown in FIG. 3, the PDCCH serving cells for scheduling the uplink data and the downlink data for the PDSCH/PUSCH serving cell may be not an identical serving cell. During the transmission of the PDSCH on the carrier of the unlicensed frequency band, in the case that a base station has just acquired a first subframe of the unlicensed frequency band through contention, there is no enough time for the base station to interact with the carrier of the unlicensed frequency band or the first subframe is not necessarily a complete data subframe, so it is difficult to transmit the downlink scheduling information on the carrier of the licensed frequency band. During the transmission of the downlink scheduling information on the carrier of the unlicensed frequency band and the transmission of the PUSCH on the carrier of the unlicensed frequency band, in the case that the uplink scheduling information is also transmitted on the carrier of the unlicensed frequency band, the base station needs to perform resource contention. In the case that the resource has been acquired through contention, it may merely be used for the transmission of the uplink scheduling information, resulting in a waste of the resource. In the case that the resource fails to be acquired through contention, an opportunity for the uplink scheduling may be limited. Hence, the uplink scheduling information may be transmitted on the licensed frequency band. According to the conventional CA mechanism, it is impossible to meet the above-mentioned scheduling requirements. However, in the embodiments of the present disclosure, the uplink scheduling information may be transmitted on the carrier of the licensed frequency band, and the downlink scheduling information may be transmitted on the carrier of the unlicensed frequency band.

The scheme in the embodiments of the present disclosure may be applied to a suitable where all the serving cells in the set of serving cells operating on the carrier of the unlicensed frequency band adopt a downlink (DL)-only transmission mode, or a situation where all the serving cells in the set of serving cells operating on the carrier of the unlicensed frequency band adopt a DL+uplink (UL) transmission mode.

In addition, the scheme in the embodiments of the present disclosure may be applied to a situation where all the serving cells in the set of serving cells operating on the carrier of the unlicensed frequency band adopt a Time Division Duplex (TDD) mode, or a situation where all the serving cells in the set of serving cells operating on the carrier of the unlicensed frequency band adopt a Frequency Division Duplex (FDD) mode.

Figure 4:
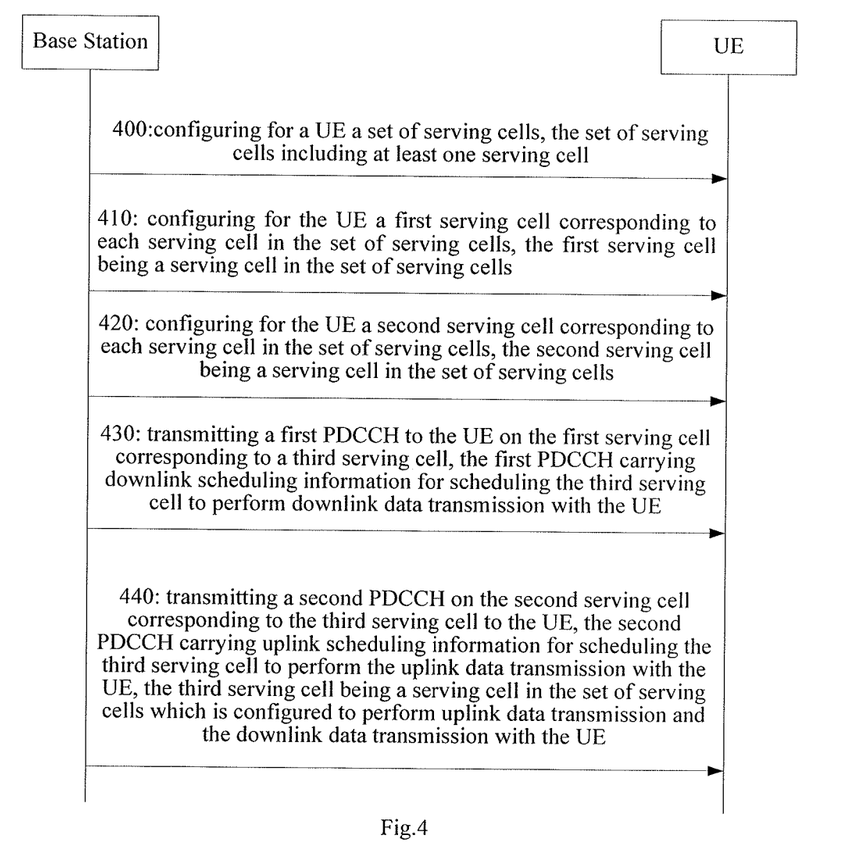
FIG. 4 is a schematic view showing signaling for a data channel scheduling method according to one embodiment of the present disclosure.

The present disclosure further provides in some embodiments a data channel scheduling method at the base station side which, as shown in FIG. 4, includes: Step 400 of configuring for a UE a set of serving cells, the set of serving cells including at least one serving cell; Step 410 of configuring for the UE a first serving cell corresponding to each serving cell in the set of serving cells, the first serving cell being a serving cell in the set of serving cells; Step 420 of configuring for the UE a second serving cell corresponding to each serving cell in the set of serving cells, the second serving cell being a serving cell in the set of serving cells; Step 430 of transmitting a first PDCCH to the UE on the first serving cell corresponding to a third serving cell, the first PDCCH carrying downlink scheduling information for scheduling the third serving cell to perform downlink data transmission with the UE, the third serving cell being a serving cell in the set of serving cells which is configured to perform uplink data transmission and the downlink data transmission with the UE; and Step 440 of transmitting a second PDCCH on the second serving cell corresponding to the third serving cell to the UE, the second PDCCH carrying uplink scheduling information for scheduling the third serving cell to perform the uplink data transmission with the UE.

In the embodiments at the base station side of the present disclosure, the first serving cell and the second serving cell may refer to those mentioned above, and thus will not be particularly defined herein.

In a possible embodiment of the present disclosure, the set of serving cells may be configured for the UE through RRC signaling.

In a possible embodiment of the present disclosure, the first serving cell corresponding to each serving cell in the set of serving cells may be configured for the UE through RRC signaling.

In a possible embodiment of the present disclosure, the second serving cell corresponding to each serving cell in the set of serving cells may be configured for the UE through RRC signaling.

The configuration of the serving cells for the UE at the base station side will be illustrated hereinafter.

In the case that all the serving cells in the set of serving cells configured by the base station for the UE operate on the carrier of the licensed frequency band, the first serving cell and the second serving cell corresponding to each serving cell in the set of serving cells may be an identical serving cells, and the configuration thereof may refer to the provisions in the $3^{rd}$ Generation Partnership Project (3GPP) Release 10.

In the case that the set of serving cells configured by the base station for the UE include the serving cells operating on the carrier of the licensed frequency band and the serving cells operating on the carrier of the unlicensed frequency band, the first serving cell and the second serving cell corresponding to each serving cell in the set of serving cells operating on the carrier of the licensed frequency band may be an identical serving cell, and the configuration thereof may refer to the provisions in 3GPP Release 10. The base station may configure the first serving cell and the second serving cell for each serving cell in the set of serving cells operating on the carrier of the unlicensed frequency band separately. In a possible embodiment of the present disclosure, the first serving cell configured for the serving cell operating on the carrier of the licensed frequency band may operate at the unlicensed frequency band, and the second serving cell configured for the serving cell operating on the carrier of the licensed frequency band may operate at the licensed frequency band. For example, the second serving cell may be a Primary Cell (PCell).

As shown in FIG. 3, carrier 1 is a carrier of the licensed frequency band, and carriers 2 and 3 are carriers of the unlicensed frequency band. The first serving cell and the second serving cell corresponding to a serving cell operating on carrier 1 are just the serving cell itself. The second serving cells corresponding to the serving cells operating on carriers 2 and 3 are just the serving cell operating on carrier 1. The first serving cell corresponding to a serving cell operating on carrier 2 is just the serving cell operating on carrier 1. A PDCCH capacity for the serving cell operating on carrier 1 may be limited, so the first serving cell corresponding to a serving cell operating on carrier 3 may be configured by the base station as the serving cell itself.

In the case that the PDCCH for scheduling the PUSCH transmitted on the carrier of the unlicensed frequency band is merely carried on a licensed carrier, it is unnecessary for the base station to perform downlink channel resource contention for transmitting the PDCCH. In addition, the transmission of the PUSCH on the carrier of the unlicensed frequency band may not be adversely affected due to the failed channel contention on the unlicensed frequency band. The transmission of the PDCCH for scheduling the PUSCH transmitted on the carrier of the licensed frequency band may be determined in accordance with a scheduling efficiency and the capacity on the carrier of the licensed frequency band. For example, in the case that the PDCCH capacity on the carrier of the licensed frequency band is sufficient, the PDCCH for scheduling the PDSCH transmitted on the carrier of the unlicensed frequency band may be transmitted on the carrier of the licensed frequency band, and otherwise, the PDCCH may be transmitted on the carrier of the unlicensed frequency band. In a word, according to the data channel scheduling method in the embodiments of the present disclosure, it is able to effectively improve the scheduling efficiency on the carrier of the unlicensed frequency band.

Figure 5:
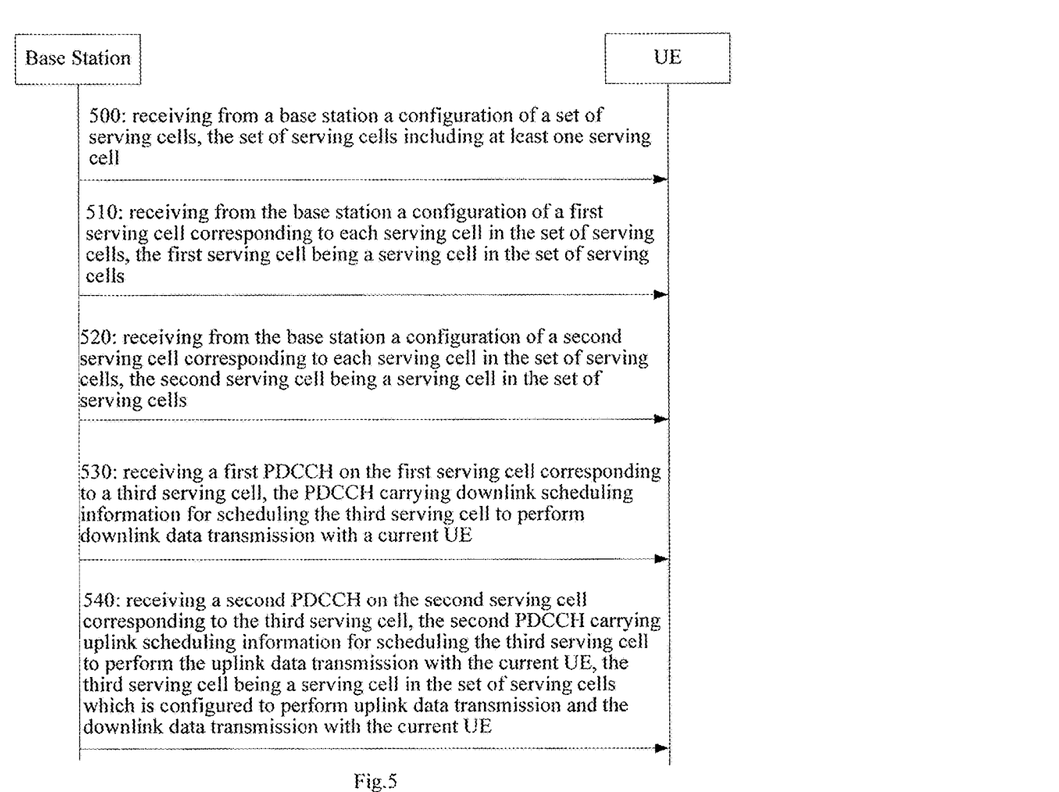
FIG. 5 is a schematic view showing signaling for another data channel scheduling method according to one embodiment of the present disclosure.

The present disclosure further provides in some embodiments a data channel scheduling method at the UE side which, as shown in FIG. 5, includes: Step 500 of receiving from a base station a configuration of a set of serving cells, the set of serving cells including at least one serving cell; Step 510 of receiving from the base station a configuration of a first serving cell corresponding to each serving cell in the set of serving cells, the first serving cell being a serving cell in the set of serving cells; Step 520 of receiving from the base station a configuration of a second serving cell corresponding to each serving cell in the set of serving cells, the second serving cell being a serving cell in the set of serving cells; Step 530 of receiving a first PDCCH on the first serving cell corresponding to a third serving cell, the PDCCH carrying downlink scheduling information for scheduling the third serving cell to perform downlink data transmission with a current UE, the third serving cell being a serving cell in the set of serving cells which is configured to perform uplink data transmission and the downlink data transmission with the current UE; and Step 540 of receiving a second PDCCH on the second serving cell corresponding to the third serving cell, the second PDCCH carrying uplink scheduling information for scheduling the third serving cell to perform the uplink data transmission with the current UE.

In the embodiments of the present disclosure, the first serving cell and the second serving cell may refer to those mentioned above, and thus will not be particularly defined herein.

In a possible embodiment of the present disclosure, the step of receiving from the base station the configuration of the set of the serving cells may include receiving from the configuration of the set of serving cells through RRC signaling.

In a possible embodiment of the present disclosure, the step of receiving from the base station the configuration of the first serving cell corresponding to each serving cell in the set of serving cells may include receiving from the base station the configuration of the first serving cell corresponding to each serving cell in the set of serving cells through RRC signaling.

In a possible embodiment of the present disclosure, the step of receiving from the base station the configuration of the second serving cell corresponding to each serving cell in the set of serving cells may include receiving from the base station the configuration of the second serving cell corresponding to each serving cell in the set of serving cells through RRC signaling.

Figure 6:
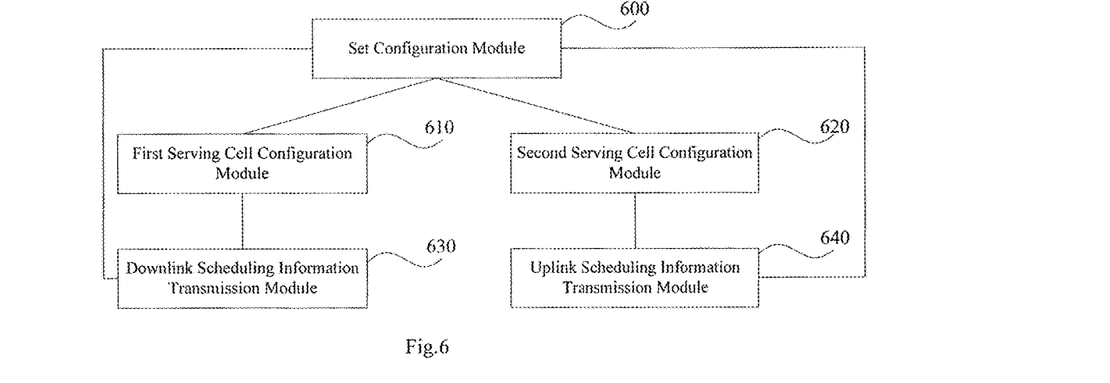
FIG. 6 is a schematic view showing a data channel scheduling device according to one embodiment of the present disclosure.

Based on an identical inventive concept, the present disclosure further provides in some embodiments a data channel scheduling device which, as shown in FIG. 6, includes: a set configuration module 600 configured to configure for a UE a set of serving cells, the set of serving cells including at least one serving cell; a first serving cell configuration module 610 configured to configure for the UE a first serving cell corresponding to each serving cell in the set of serving cells, the first serving cell being a serving cell in the set of serving cells; a second serving cell configuration module 620 configured to configure for the UE a second serving cell corresponding to each serving cell in the set of serving cells, the second serving cell being a serving cell in the set of serving cells; a downlink scheduling information transmission module 630 configured to transmit a first PDCCH to the UE on the first serving cell corresponding to a third serving cell, the first PDCCH carrying downlink scheduling information for scheduling the third serving cell to perform downlink data transmission with the UE; and an uplink scheduling information transmission module 640 configured to transmit a second PDCCH on the second serving cell corresponding to the third serving cell to the UE, the second PDCCH carrying uplink scheduling information for scheduling the third serving cell to perform the uplink data transmission with the UE, the third serving cell being a serving cell in the set of serving cells which is configured to perform uplink data transmission and the downlink data transmission with the UE.

In a possible embodiment of the present disclosure, the first serving cell corresponding to each serving cell in the set of serving cells is the serving cell itself, or any serving cell other than the serving cell.

In a possible embodiment of the present disclosure, in the case that the first serving cell is the serving cell itself, the first serving cell operates at an unlicensed frequency band, and in the case that the first serving cell is any serving cell other than the serving cell, the first serving cell operates at a licensed frequency band.

In a possible embodiment of the present disclosure, the second serving cell corresponding to each serving cell in the set of serving cells maybe any serving cell other than the serving cell, or the serving cell itself.

In a possible embodiment of the present disclosure, in the case that the second serving cell is any serving cell other than the serving cell, the second serving cell operates at a licensed frequency band, and in the case that the second serving cell is the serving cell itself, the second serving cell operates at an unlicensed frequency band.

In a possible embodiment of the present disclosure, the first serving cell and the second serving cell corresponding to an identical serving cell in the set of serving cells are an identical serving cell or different serving cells.

In a possible embodiment of the present disclosure, the set configuration module is further configured to configure for the UE the set of serving cells through RRC signaling.

In a possible embodiment of the present disclosure, the first serving cell configuration module is further configured to configure for the UE the first serving cell corresponding to each serving cell in the set of serving cells through RRC signaling.

In a possible embodiment of the present disclosure, the second serving cell configuration module is configured to configure for the UE the second serving cell corresponding to each serving cell in the set of serving cells through RRC signaling.

Figure 7:
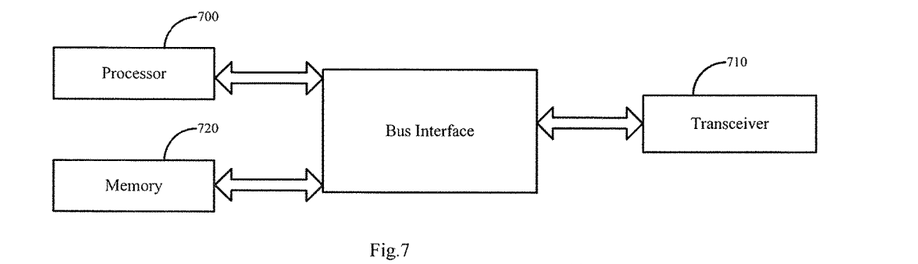
FIG. 7 is a schematic view showing a base station according to one embodiment of the present disclosure.

Based on an identical inventive concept, the present disclosure provides in some embodiments a base station which, as shown in FIG. 7, includes a processor 700, a transceiver 710 and a memory 720. The processor 700 is configured to read a program stored in the memory 720, so as to: configure for a UE a set of serving cells, the set of serving cells including at least one serving cell; configure for the UE a first serving cell corresponding to each serving cell in the set of serving cells, the first serving cell being a serving cell in the set of serving cells; configure for the UE a second serving cell corresponding to each serving cell in the set of serving cells, the second serving cell being a serving cell in the set of serving cells; transmit through the transceiver 710 a first PDCCH to the UE on the first serving cell corresponding to a third serving cell, the first PDCCH carrying downlink scheduling information for scheduling the third serving cell to perform downlink data transmission with the UE; and transmit through the transceiver 710 a second PDCCH on the second serving cell corresponding to the third serving cell to the UE, the second PDCCH carrying uplink scheduling information for scheduling the third serving cell to perform the uplink data transmission with the UE, the third serving cell being a serving cell in the set of serving cells which is configured to perform uplink data transmission and the downlink data transmission with the UE. The transceiver 710 is configured to receive and transmit data under the control of the processor 700. The memory 720 is configured to store therein data for the operation of the processor 700.

In FIG. 7, the bus architecture may include a number of buses and bridges connected to each other, so as to connect various circuits for one or more processors 700 and one or more memories 720. In addition, as is known in the art, the bus architecture may be used to connect any other circuits, such as a circuit for a peripheral device, a circuit for a voltage stabilizer and a power management circuit. Bus interfaces are provided, and the transceiver 710 may consist of a plurality of elements, i.e., a transmitter and a receiver for communication with any other devices over a transmission medium. The processor 700 may take charge of managing the bus architecture as well as general processings. The memory 720 may store data desired for the operation of the processor 700.

Figure 8:
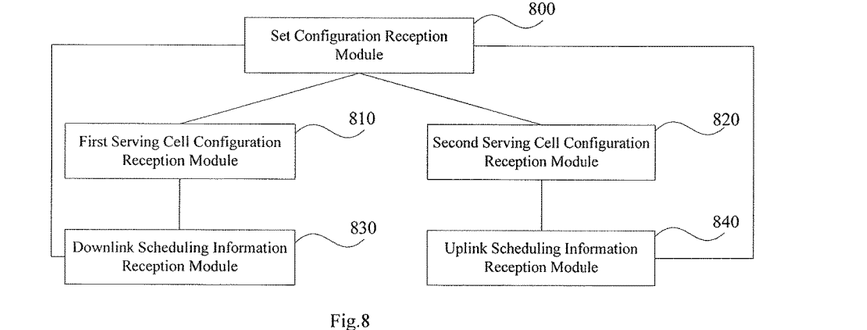
FIG. 8 is a schematic view showing another data channel scheduling device according to one embodiment of the present disclosure.

Based on an identical inventive concept, the present disclosure further provides in some embodiments a data channel scheduling device which, as shown in FIG. 8, includes: a set configuration reception module 800 configured to receive from a base station a configuration of a set of serving cells, the set of serving cells including at least one serving cell; a first serving cell configuration reception module 810 configured to receive from the base station a configuration of a first serving cell corresponding to each serving cell in the set of serving cells, the first serving cell being a serving cell in the set of serving cells; a second serving cell configuration reception module 820 configured to receive from the base station a configuration of a second serving cell corresponding to each serving cell in the set of serving cells, the second serving cell being a serving cell in the set of serving cells; a downlink scheduling information reception module 830 configured to receive a first PDCCH on the first serving cell corresponding to a third serving cell, the PDCCH carrying downlink scheduling information for scheduling the third serving cell to perform downlink data transmission with a current UE; and an uplink scheduling information reception module 840 configured to receive a second PDCCH on the second serving cell corresponding to the third serving cell, the second PDCCH carrying uplink scheduling information for scheduling the third serving cell to perform the uplink data transmission with the current UE, the third serving cell being a serving cell in the set of serving cells which is configured to perform uplink data transmission and the downlink data transmission with the current UE.

In a possible embodiment of the present disclosure, the first serving cell corresponding to each serving cell in the set of serving cells is the serving cell itself, or any serving cell other than the serving cell.

In a possible embodiment of the present disclosure, in the case that the first serving cell is the serving cell itself, the first serving cell operates at an unlicensed frequency band, and in the case that the first serving cell is any serving cell other than the serving cell, the first serving cell operates at a licensed frequency band.

In a possible embodiment of the present disclosure, the second serving cell corresponding to each serving cell in the set of serving cells is any serving cell other than the serving cell, or the serving cell itself.

In a possible embodiment of the present disclosure, in the case that the second serving cell is any serving cell other than the serving cell, the second serving cell operates at a licensed frequency band, and in the case that the second serving cell is the serving cell itself, the second serving cell operates at an unlicensed frequency band.

In a possible embodiment of the present disclosure, the first serving cell and the second serving cell corresponding to an identical serving cell in the set of serving cells are an identical serving cell or different serving cells.

In a possible embodiment of the present disclosure, the set configuration reception module is further configured to receive from the base station the configuration of the set of serving cells through RRC signaling.

In a possible embodiment of the present disclosure, the first serving cell configuration reception module is further configured to receive from the base station the configuration of the first serving cell corresponding to each serving cell in the set of serving cells through RRC signaling.

In a possible embodiment of the present disclosure, the second serving cell configuration reception module is further configured to receive from the base station the configuration of the second serving cell corresponding to each serving cell in the set of serving cells through RRC signaling.

Figure 9:
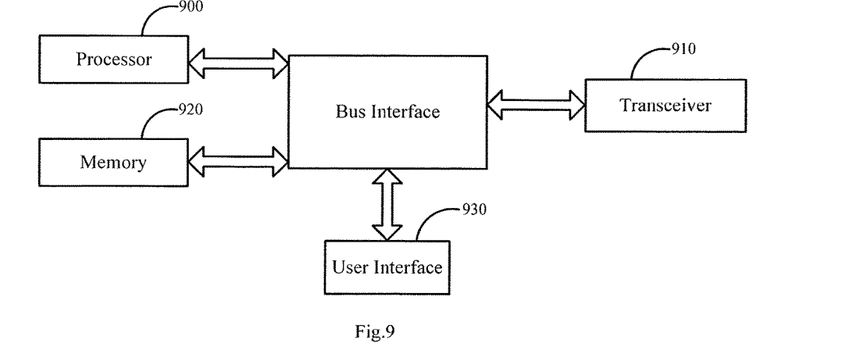
FIG. 9 is a schematic view showing a UE according to one embodiment of the present disclosure.

Based on an identical inventive concept, the present disclosure further provides in some embodiments a UE which, as shown in FIG. 9, includes a processor 900, a transceiver 910 and a memory 920. The processor 900 is configured to read a program stored in the memory 920, so as to: receive through the transceiver 910 from a base station a configuration of a set of serving cells, the set of serving cells including at least one serving cell; receive through the transceiver 910 from the base station a configuration of a first serving cell corresponding to each serving cell in the set of serving cells, the first serving cell being a serving cell in the set of serving cells; receive through the transceiver 910 from the base station a configuration of a second serving cell corresponding to each serving cell in the set of serving cells, the second serving cell being a serving cell in the set of serving cells; receive through the transceiver 910 a first PDCCH on the first serving cell corresponding to a third serving cell, the PDCCH carrying downlink scheduling information for scheduling the third serving cell to perform downlink data transmission with a current UE; and receive through the transceiver 910 a second PDCCH on the second serving cell corresponding to the third serving cell, the second PDCCH carrying uplink scheduling information for scheduling the third serving cell to perform the uplink data transmission with the current UE, the third serving cell being a serving cell in the set of serving cells which is configured to perform uplink data transmission and the downlink data transmission with the current UE. The transceiver 910 is configured to receive and transmit data under the control of the processor 900. The memory 920 may store therein data for the operation of the processor 900.

In FIG. 9, bus architecture may include a number of buses and bridges connected to each other, so as to connect various circuits for one or more processors 900 and one or more memories 920. In addition, as is known in the art, the bus architecture may be used to connect any other circuits, such as a circuit for a peripheral device, a circuit for a voltage stabilizer and a power management circuit. Bus interfaces are provided, and the transceiver 910 may consist of a plurality of elements, i.e., a transmitter and a receiver for communication with any other devices over a transmission medium. With respect to different UEs, a user interface 930 may also be provided for devices which are to be arranged inside or outside the UE, and these devices may include but not limited to a keypad, a display, a speaker, a microphone and a joystick. The processor 900 may take charge of managing the bus architecture as well as general processings. The memory 920 may store data desired for the operation of the processor 900.

Based on an identical inventive concept, the present disclosure further provides in some embodiments a data channel scheduling system, including a base station and a UE. The base station is configured to: configure for the UE a set of serving cells, the set of serving cells including at least one serving cell; configure for the UE a first serving cell corresponding to each serving cell in the set of serving cells, the first serving cell being a serving cell in the set of serving cells; configure for the UE a second serving cell corresponding to each serving cell in the set of serving cells, the second serving cell being a serving cell in the set of serving cells; transmit a first PDCCH to the UE on the first serving cell corresponding to a third serving cell, the first PDCCH carrying downlink scheduling information for scheduling the third serving cell to perform downlink data transmission with the UE; and transmit a second PDCCH on the second serving cell corresponding to the third serving cell to the UE, the second PDCCH carrying uplink scheduling information for scheduling the third serving cell to perform the uplink data transmission with the UE, the third serving cell being a serving cell in the set of serving cells which is configured to perform uplink data transmission and the downlink data transmission with the UE. The UE is configured to: receive from a base station a configuration of the set of serving cells; receive from the base station a configuration of the first serving cell corresponding to each serving cell in the set of serving cells; receive from the base station a configuration of the second serving cell corresponding to each serving cell in the set of serving cells; receive the first PDCCH on the first serving cell corresponding to the third serving cell; and receive the second PDCCH on the second serving cell corresponding to the third serving cell.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc-Read Only Memory (CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although the preferred embodiments have been described above, a person skilled in the art may make modifications and alterations to these embodiments in accordance with the basic concept of the present disclosure. So, the attached claims are intended to include the preferred embodiments and all of the modifications and alterations that fall within the scope of the present disclosure.

The above are merely the preferred embodiments of the present disclosure. Obviously, a person skilled in the art may make further modifications and improvements without departing from the spirit of the present disclosure, and these modifications and improvements shall also fall within the scope of the present disclosure.

What is claimed is:

1. A data channel scheduling method, comprising steps of:
   receiving from a base station a configuration of a set of serving cells, the set of serving cells comprising at least one serving cell;
   receiving from the base station a configuration of a first serving cell corresponding to each serving cell in the set of serving cells, the first serving cell being a serving cell in the set of serving cells;
   receiving from the base station a configuration of a second serving cell corresponding to each serving cell in the set of serving cells, the second serving cell being a serving cell in the set of serving cells;
   receiving a first Physical Downlink Control Channel (PDCCH) on the first serving cell corresponding to a third serving cell, the PDCCH carrying downlink scheduling information for scheduling the third serving cell to perform downlink data transmission with a current User Equipment (UE), the third serving cell being a serving cell in the set of serving cells which is configured to perform uplink data transmission and the downlink data transmission with the current UE; and
   receiving a second PDCCH on the second serving cell corresponding to the third serving cell, the second PDCCH carrying uplink scheduling information for scheduling the third serving cell to perform the uplink data transmission with the current UE.

2. The data channel scheduling method according to claim 1, wherein the first serving cell corresponding to each serving cell in the set of serving cells is the serving cell itself.

3. The data channel scheduling method according to claim 1, wherein the first serving cell corresponding to each serving cell in the set of serving cells is any serving cell other than the serving cell.

4. The data channel scheduling method according to claim 2, wherein the first serving cell corresponding to each serving cell in the set of serving cells is a serving cell operating at an unlicensed frequency band.

5. The data channel scheduling method according to claim 1, wherein the second serving cell corresponding to each serving cell in the set of serving cells is any serving cell other than the serving cell.

6. The data channel scheduling method according to claim 1, wherein the second serving cell corresponding to each serving cell in the set of serving cells is the serving cell itself.

7. The data channel scheduling method according to claim 5, wherein the second serving cell corresponding to each serving cell in the set of serving cells is a serving cell operating a licensed frequency band.

8. The data channel scheduling method according to claim 1, wherein the first serving cell and the second serving cell corresponding to an identical serving cell in the set of serving cells are an identical serving cell or different serving cells.

9. The data channel scheduling method according to claim 1, wherein the step of receiving from the base station the configuration of the set of serving cells comprises receiving from the base station the configuration of the set of serving cells through Radio Resource Control (RRC) signaling;
   the step of receiving from the base station the configuration of the first serving cell corresponding to each serving cell in the set of serving cells includes receiving from the base station the configuration of the first serving cell corresponding to each serving cell in the set of serving cells through RRC signaling; and
   the step of receiving from the base station the configuration of the second serving cell corresponding to each serving cell in the set of serving cells includes receiving from the base station the configuration of the second serving cell corresponding to each serving cell in the set of serving cells through RRC signaling.

10. A data channel scheduling method, comprising steps of:
    configuring for a User Equipment (UE) a set of serving cells, the set of serving cells comprising at least one serving cell;
    configuring for the UE a first serving cell corresponding to each serving cell in the set of serving cells, the first serving cell being a serving cell in the set of serving cells;

configuring for the UE a second serving cell corresponding to each serving cell in the set of serving cells, the second serving cell being a serving cell in the set of serving cells;

transmitting a first Physical Downlink Control Channel (PDCCH) to the UE on the first serving cell corresponding to a third serving cell, the first PDCCH carrying downlink scheduling information for scheduling the third serving cell to perform downlink data transmission with the UE, the third serving cell being a serving cell in the set of serving cells which is configured to perform uplink data transmission and the downlink data transmission with the UE; and transmitting a second PDCCH on the second serving cell corresponding to the third serving cell to the UE, the second PDCCH carrying uplink scheduling information for scheduling the third serving cell to perform the uplink data transmission with the UE.

11. The data channel scheduling method according to claim 10, wherein the first serving cell corresponding to each serving cell in the set of serving cells is the serving cell itself.

12. The data channel scheduling method according to claim 10, wherein the first serving cell corresponding to each serving cell in the set of serving cells is any serving cell other than the serving cell.

13. The data channel scheduling method according to claim 11, wherein the first serving cell corresponding to each serving cell in the set of serving cells is a serving cell operating at an unlicensed frequency band.

14. The data channel scheduling method according to claim 10, wherein the second serving cell corresponding to each serving cell in the set of serving cells is any serving cell other than the serving cell.

15. The data channel scheduling method according to claim 10, wherein the second serving cell corresponding to each serving cell in the set of serving cells is the serving cell itself.

16. The data channel scheduling method according to claim 14, wherein the second serving cell corresponding to each serving cell in the set of serving cells is a serving cell operating a licensed frequency band.

17. The data channel scheduling method according to claim 10, wherein the first serving cell and the second serving cell corresponding to an identical serving cell in the set of serving cells are an identical serving cell or different serving cells.

18. The data channel scheduling method according to claim 10, wherein the step of configuring for the UE the set of serving cells comprises configuring for the UE the set of serving cells through radio resource control (RRC) signaling;

the step of configuring for the UE the first serving cell corresponding to each serving cell in the set of serving cells comprises configuring for the UE the first serving cell corresponding to each serving cell in the set of serving cells through RRC signaling; and the step of configuring for the UE the second serving cell corresponding to each serving cell in the set of serving cells comprises configuring for the UE the second serving cell corresponding to each serving cell in the set of serving cells through RRC signaling.

19. A User Equipment (UE), comprising a processor, a transceiver and a memory;

wherein the processor is configured to read a program stored in the memory to:

receive through the transceiver from a base station a configuration of a set of serving cells, the set of serving cells comprising at least one serving cell;

receive through the transceiver from the base station a configuration of a first serving cell corresponding to each serving cell in the set of serving cells, the first serving cell being a serving cell in the set of serving cells;

receive through the transceiver from the base station a configuration of a second serving cell corresponding to each serving cell in the set of serving cells, the second serving cell being a serving cell in the set of serving cells;

receive through the transceiver a first Physical Downlink Control Channel (PDCCH) on the first serving cell corresponding to a third serving cell, the PDCCH carrying downlink scheduling information for scheduling the third serving cell to perform downlink data transmission with a current UE; and receive through the transceiver a second PDCCH on the second serving cell corresponding to the third serving cell, the second PDCCH carrying uplink scheduling information for scheduling the third serving cell to perform uplink data transmission with the current UE, the third serving cell being a serving cell in the set of serving cells which is configured to perform the uplink data transmission and the downlink data transmission with the current UE.

20. A base station, comprising a processor, a transceiver and a memory, wherein the processor is configured to read a program stored in the memory to:

configure for a User Equipment (UE) a set of serving cells, the set of serving cells comprising at least one serving cell;

configure for the UE a first serving cell corresponding to each serving cell in the set of serving cells, the first serving cell being a serving cell in the set of serving cells;

configure for the UE a second serving cell corresponding to each serving cell in the set of serving cells, the second serving cell being a serving cell in the set of serving cells;

transmit through the transceiver a first Physical Downlink Control Channel (PDCCH) to the UE on the first serving cell corresponding to a third serving cell, the first PDCCH carrying downlink scheduling information for scheduling the third serving cell to perform downlink data transmission with the UE; and transmit through the transceiver a second PDCCH on the second serving cell corresponding to the third serving cell to the UE, the second PDCCH carrying uplink scheduling information for scheduling the third serving cell to perform uplink data transmission with the UE, the third serving cell being a serving cell in the set of serving cells which is configured to perform the uplink data transmission and the downlink data transmission with the UE.

* * * * *